(12) United States Patent
Oriani

(10) Patent No.: US 7,238,748 B2
(45) Date of Patent: Jul. 3, 2007

(54) PROCESS AID FOR METALLOCENE CATALYZED LINEAR LOW DENSITY POLYETHYLENE POLYMERS

(75) Inventor: Steven Richard Oriani, Landenberg, PA (US)

(73) Assignee: DuPont Performance Elastomers L.L.C., Wilimington, DE (US)

( * ) Notice: Subject to any disclaimer, the term of this patent is extended or adjusted under 35 U.S.C. 154(b) by 364 days.

(21) Appl. No.: 10/911,037

(22) Filed: Aug. 4, 2004

(65) Prior Publication Data

US 2005/0043456 A1 Feb. 24, 2005

Related U.S. Application Data

(60) Provisional application No. 60/496,447, filed on Aug. 20, 2003.

(51) Int. Cl.
*C08L 27/12* (2006.01)

(52) U.S. Cl. ........................ 525/199; 525/240; 524/377

(58) Field of Classification Search ................ 525/199, 525/240; 524/377
See application file for complete search history.

(56) References Cited

U.S. PATENT DOCUMENTS

| | | | |
|---|---|---|---|
| 3,125,547 A | 3/1964 | Blatz | |
| 4,855,360 A | 8/1989 | Duchesne et al. | |
| 4,904,735 A | 2/1990 | Chapman, Jr. et al. | |
| 5,106,911 A | 4/1992 | Chapman, Jr. et al. | |
| 5,587,429 A | 12/1996 | Priester | |
| 5,707,569 A | 1/1998 | Priester et al. | |
| 5,710,217 A * | 1/1998 | Blong et al. ................. | 525/199 |
| 5,854,352 A * | 12/1998 | Chisholm et al. ........... | 525/199 |
| 6,242,548 B1 | 6/2001 | Duchesne et al. | |
| 6,277,919 B1 | 8/2001 | Dillon et al. | |
| 6,294,604 B1 * | 9/2001 | Focquet et al. ............. | 524/433 |
| 6,642,310 B2 | 11/2003 | Chapman, Jr. et al. | |
| 2002/0063359 A1 * | 5/2002 | Williams et al. ............ | 264/211 |

* cited by examiner

*Primary Examiner*—Kelechi C. Egwim

(57) ABSTRACT

Extrusion processability of resin blends of a metallocene catalyzed linear low density polyethylene and a low density polyethylene is improved by introducing a process aid package comprising a fluoroelastomer having a Mooney viscosity (ML(1+10) at 121° C.) between 30 and 60 and an interfacial agent.

9 Claims, No Drawings

PROCESS AID FOR METALLOCENE CATALYZED LINEAR LOW DENSITY POLYETHYLENE POLYMERS

CROSS-REFERENCE TO RELATED APPLICATIONS

This application claims the benefit of U.S. Provisional Application No. 60/496,447 filed Aug. 20, 2003.

FIELD OF THE INVENTION

The present invention relates to fluoroelastomer processing aids for the extrusion of resin blends of metallocene catalyzed linear low density polyethylene resin and low density polyethylene resin.

BACKGROUND OF THE INVENTION

The melt extrusion of high molecular weight polyethylene into shaped structures such as tubing, pipe, wire coating or film is accomplished by well-known procedures wherein a rotating screw pushes a viscous polymer melt through an extruder barrel into a die in which the polymer is shaped to the desired form and is then subsequently cooled and solidified into a product having the general shape of the die.

In order to achieve low production costs, it is desirable to extrude the polymer at rapid rates. Higher extrusion rates may be readily obtained by increasing the rate of revolution of the extruder screw. However, this technique is subject to limitations imposed by the viscoelastic properties of the polymer substrate. Thus, at very high extrusion rates an unacceptable amount of thermal decomposition of the polymer can result. Further, extrudates having a rough surface are often obtained which can lead to formation of an undesirable pattern on the surface of the extrudate.

In Blatz, U.S. Pat. No. 3,125,547, it is disclosed that the use of 0.01–2.0 wt. % of a fluorocarbon polymer that is in a fluid state at the process temperature, such as a fluoroelastomer, will reduce die pressure in extrusions of non-fluorinated polymers such as high and low density polyethylenes and other polyolefins. Further, use of this additive allows significant increase in extrusion rates without melt fracture.

More recently, improved fluoropolymer process aid compositions have been disclosed in, for example, U.S. Pat. Nos. 4,855,360; 4,904,735; 5,106,911; 5,587,429; 5,707,569; 6,242,548 B1; 6,277,919 B1 and 6,642,310 B2.

Linear low density polyethylene (LLDPE) resins that were manufactured in a process employing a metallocene catalyst (referred to hereinafter as mLL resins) have particularly poor rheology for blown film production, i.e. low melt strength (low elongational viscosity) and relatively little tendency to shear thin. Low melt strength generally results in soft and unstable blown film bubbles, leading to gauge variations. Lack of shear thinning results in high extrusion power requirements as well as high barrel and die pressures. To alleviate these problems, film processors often find it useful to blend low density polyethylene (LDPE) with mLL resins, because LDPE resins display excellent melt strength and shear thinning characteristics. LDPE resins are made via a high pressure, free-radical polymerization process. Although the physical properties of LDPE are far inferior to those of mLL resins, blends containing less than 50% LDPE have physical properties closer to those of mLL resins than to those of LDPE resins, while having much improved processability.

Additionally, mLL resins often have a low critical shear rate for the onset of melt fracture and thus readily exhibit melt fracture. Surprisingly, mLL-LDPE blends can display a form of melt fracture that is resistant to elimination by most fluoropolymer process aids. For example, when a mLL-LDPE blend is extruded at 500 1/s shear rate, the resulting film is fully melt fractured. Introducing a fluoropolymer process aid typically improves the film surface smoothness considerably, but defects taking the shape of ellipses may remain in the areas where the process aid has taken effect. As a result, once the fluoropolymer process aid has done the job of clearing the "hard" fracture, the film can still be covered with unacceptable defects. In mild cases, the ellipses are very light and infrequent, and the film may be acceptable. In other cases, the ellipses are so numerous and large that they merge together to form a continuous fracture pattern. Interestingly, increasing fluoropolymer process aid level in the mLL-LDPE blend only makes the ellipse defects worse, so that film processors often cannot find a window in which to operate between the extremes of low process aid level, where hard fracture may return, and high process aid level, which aggravates the ellipses.

Thus there is a need for a process aid composition which reduces melt fracture in mLL-LDPE blends without introducing elliptically shaped defects in the resulting films.

SUMMARY OF THE INVENTION

It has been surprisingly discovered that process aids comprising a fluoroelastomer of moderate Mooney viscosity and a low level of an interfacial agent (as hereinafter defined) reduces or eliminates melt fracture in mLL-LDPE films without introducing elliptically shaped defects.

Accordingly, one aspect of the present invention is an extrudable composition comprising:
  A) a resin blend comprising 1 to 99 weight percent, based on total weight of said resin blend, of a metallocene catalyzed linear low density polyethylene resin and 99 to 1 weight percent, based on total weight of said resin blend, of a low density polyethylene resin;
  B) 25 to 2000 ppm, based on total weight of said extrudable composition, of a fluoroelastomer having a Mooney viscosity ML(1+10) at 121° C. between 30 and 60; and
  C) an interfacial agent in an amount resulting in a weight ratio of interfacial agent to fluoroelastomer between 0.1 and 0.9; wherein said extrudable composition contains 0 to 20 ppm ionomer.

DETAILED DESCRIPTION OF THE INVENTION

The present invention is directed to means for improving the extrusion processability of blends of metallocene catalyzed linear low density polyethylene (mLL) resins and low density polyethylene (LDPE) resins, without introducing elliptically shaped defects in the extruded product. The term "extrusion processability" as used herein refers to the conditioning time (i.e. the elapsed time between extruder start up when extruded articles exhibit a high degree of melt fracture and the time when an extrudate has a smooth surface, free of melt fracture). Obviously, in order to minimize waste and reduce costs, a very short conditioning time is desirable.

By the term "metallocene catalyzed linear low density polyethylene resins" is meant a copolymer of ethylene and an α-olefin, polymerized using a catalyst comprising one or more cyclopentadienyl groups bound to a metal center. The cyclopentadienyl group(s) may be substituted wherein one or more of the hydrogen radicals is replaced by a halogen, amido, phosophido, alkoxy, or alkylborido radical, or any other radical containing a Lewis acidic or basic functionality. The cyclopentadienyl group may also be substituted with an aryl or alkyl group, or be fused to form a saturated or unsaturated polycyclicpentadienyl group, such as indenyl, tetrahydroindenyl, fluorenyl, or the like. The catalyst may also contain other ligands that are not of a cyclopentadienyl type. The metal center is of Group IV or the Lanthanide series from the Periodic Table of the Elements (published and copyrighted by CRC Press, 1989). Such catalysts are also known as "single-site" catalysts, because the metal center contains only one active site for polymerization. As a result, these catalysts produce copolymers of ethylene and an α-olefin having a relatively narrow molecular weight distribution (<3, preferably <2.4) and a uniform α-olefin distribution along the polymer chain, regardless of the chain molecular weight. In addition, mLL polymers are linear or substantially linear, typically having less than one long chain branch per 1000 carbon atoms. Optionally, the catalyst system may incorporated a second component that does not contain the cyclopentadienyl functionality, said component acting as a co-catalyst or an activator for the primary catalyst. Such catalyst systems are described in U.S. Pat. Nos. 5,026,798 and 5,350,723. Examples of mLL resins include products sold under the trade names Exact™ and Exceed™ by ExxonMobil Chemical Co., and Affinity™ and Elite™ by The Dow Chemical Co.

By the term "low density polyethylene resins" is meant polyethylene homopolymers that are polymerized by free-radical techniques, rather than metallocene catalyzed processes, in high pressure tubular or autoclave reactors. Such resins are highly branched, have a density less than 0.94 g/cc and have a molecular weight distribution (MWD) greater than 3. Examples of LDPE resins include the ExxonMobil LD series resins, and the LDPE series of resins available from Dow Chemical.

Resin blends employed in the compositions of this invention comprise 1 to 99 (preferably 50 to 90) weight percent, based on total weight of the resin blend, of a metallocene catalyzed linear low density polyethylene resin and 99 to 1 (preferably 50 to 10) weight percent, based on total weight of the resin blend, of a low density polyethylene resin.

Fluoroelastomers useful in the extrudable compositions of this invention are fluoropolymers that are normally in the fluid state at room temperature and above, i.e. fluoropolymers which have values of $T_g$ below room temperature and which exhibit little or no crystallinity at room temperature. It is preferred, but not essential, to employ fluoroelastomers having a fluorine to hydrogen ratio of at least 1:1.5. Fluorinated monomers which may be copolymerized to yield suitable fluoroelastomers include, but are not limited to vinylidene fluoride, hexafluoropropylene, chlorotrifluoroethylene, tetrafluoroethylene and perfluoroalkyl perfluorovinyl ethers. Specific examples of the fluoroelastomers which may be employed include, but are not limited to copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and a comonomer selected from hexafluoropropylene, 1-hydropentafluoropropylene or 2-hydropentafluoropropylene; and copolymers of tetrafluoroethylene, propylene and, optionally, vinylidene fluoride, all of which are known in the art. In some cases these copolymers may also include bromine-containing comonomers as taught in Apotheker and Krusic, U.S. Pat. No. 4,035,565, or terminal iodo-groups, as taught in U.S. Pat. No. 4,243,770. The latter patent also discloses the incorporation of iodo group-containing fluoroolefin comonomers into fluoroelastomers. When fluorinated monomers are present in these copolymers in certain molar ratios, the glass transition temperature of the polymer is near or below 0° C., and the compositions are useful elastomers that are readily available articles of commerce. Preferably the fluoroelastomers employed in the compositions of this invention contain copolymerized units of i) vinylidene fluoride/hexafluoropropylene; ii) vinylidene fluoride/hexafluoropropylene/tetrafluoroethylene; iii) tetrafluoroethylene/propylene; or iv) tetrafluoroethylene/propylene/vinylidene fluoride.

Fluoroelastomers employed in the extrudable compositions of this invention have a Mooney viscosity (ML(1+10) at 121° C.) between 30 and 60 and are present at a level of 25 to 2000 ppm, based on the total weight of the composition. More than one fluoroelastomer may be employed in the compositions of this invention, wherein the total fluoroelastomer level is 25 to 2000 ppm.

Compositions of this invention also comprise an interfacial agent. The level of interfacial agent is such that the weight ratio of interfacial agent to fluoroelastomer is 0.1 to 0.9 (preferably 0.2 to 0.8). More than one interfacial agent may be employed in the compositions of this invention, wherein the weight ratio of total interfacial agent to fluoroelastomer is 0.1 to 0.9.

By "interfacial agent" is meant a compound, different from the fluoroelastomer, mLL and LDPE resins, which is characterized by 1) being in the liquid state (or molten) at the extrusion temperature, 2) having a lower melt viscosity than the mLL and LDPE resins and fluoroelastomer, and 3) freely wets the surface of the fluoroelastomer particles in the extrudable composition. Examples of such interfacial agents include, but are not limited to i) silicone-polyether copolymers; ii) aliphatic polyesters such as poly(butylene adipate), poly(lactic acid) and polycaprolactone polyesters (preferably, the polyester is not a block copolymer of a dicarboxylic acid with a poly(oxyalkylene) polymer); iii) aromatic polyesters such as phthalic acid diisobutyl ester; iv) polyether polyols (preferably, not a polyalkylene oxide) such as poly (tetramethylene ether glycol); v) amine oxides such as octyldimethyl amine oxide; vi) carboxylic acids such as hydroxy-butanedioic acid; vii) fatty acid esters such as sorbitan monolaurate and triglycerides; and vii) poly(oxyalkylene) polymers. As used herein, the term "poly(oxyalkylene) polymers" refers to those polymers and their derivatives that are defined in U.S. Pat. No. 4,855,360. Such polymers include polyethylene glycols and their derivatives.

A preferred aliphatic polyester interfacial agent is a polycaprolactone having a number average molecular weight in the range 1000 to 32000, preferably 2000 to 10000, and most preferably 2000 to 4000. Preferably, the polycaprolactone polymers were derived from the ring opening reaction of epsilon-caprolactone, initiated by 1,4-butanediol.

The interfacial agent is a relatively low molecular weight ingredient which, for a particular system of fluoroelastomer process aid and mLL-LDPE resin blend, preferentially locates as a third phase at the interface between the fluoroelastomer phase and the mLL-LDPE resin blend phase.

The compositions of this invention are substantially free from ionomers. By "substantially free" is meant less than 20 ppm, preferably less than 10 ppm, most preferably 0 ppm ionomer, based on the total weight of the extrudable composition of the invention. Higher levels of ionomer cause surface roughness of blown films. By "ionomers" are meant ionomeric polymers made by at least partially neutralizing the carboxylic acid groups of resins that are the copolymers of a $C_2$–$C_4$ α-olefin with an ethylinically unsaturated carboxylic acid or dicarboxylic acid. Specific examples of ionomers include, but are not limited to ethylene/acrylic acid copolymers and ethylene/methacrylic acid copolymers wherein the pendant carboxylic acid groups have been at least partially converted to a salt with at least one cation such as lithium, sodium, potassium, magnesium, calcium, barium, lead, tin, zinc or aluminum. Ionomers are well known in the art; see U.S. Pat. No. 3,264,272, for example.

A process suitable for making the extrudable compositions of this invention is one in which the fluoroelastomer, interfacial agent, mLL, and LDPE are combined in any order upstream of the blown film die. Preferably, the fluoroelastomer and interfacial agent are compounded to produce a process aid concentrate containing a polyolefin resin carrier, 1 to 10 wt. % fluoroelastomer, and the corresponding amount of interfacial agent to maintain the 0.1 to 0.9 interfacial agent to fluoroelastomer weight ratio. The polyolefin resin utilized as carrier may be any polymer comprising ethylene units and, optionally, copolymerized units of a $C_2$–$C_{10}$ α-olefin. Preferably, the carrier resin has a melting point less than or equal to the melting points of the mLL and LPDE resins and also has a melt index (190° C., 2160 g) greater than the melt index of the mLL and LPDE resins. Suitable mixers for compounding the concentrate include single or twin screw extruders, internal mixers such as a Banbury type, or a two-roll rubber mill. The concentrate is then let down to the final process aid concentration in a pellet blend of mLL and LDPE resins and introduced to the hopper of a film extruder. Alternatively, the mLL and LDPE can be melt mixed in any of the devices listed above, pelletized, and dry blended with the process aid concentrate prior to entering the film extruder. A final preferred method for introducing the composition to a film extruder involves compounding the process aid composition into the mLL resin (either by direct addition of the process aid composition or through the intermediate step of a process aid concentrate), then pellet blending the mLL—process aid mixture with LDPE prior to introducing the mixture to the hopper of the film extruder.

Extrudable compositions of this invention may, optionally, contain other ingredients such as, but not limited to fillers (e.g. carbon black, silicon dioxide, talc, and titanium dioxide), colorants, antioxidants, and antiblocks. These auxiliary ingredients may be added at any of the afore-mentioned compounding steps, up to and including the final melt shaping process.

The extrudable compositions of this invention are particularly useful in manufacture of blown films and wire and cable jacketing.

EXAMPLES

The materials employed in these examples were as follows:

The mLL-LDPE resin blend was a 70/30 (by weight) blend of Exxon-Mobil 1018C mLL and Dow 640i LDPE. Melt indices (190° C., 2160 g) of each resin were 1 and 2, respectively.

Polymer process aid masterbatches used in these examples were PPA-1: a blend containing a) 52 wt. % of a vinylidene fluoride/hexafluoropropylene (60/40 wt. ratio) copolymer fluoroelastomer having a ML(1+10) at 121° C. of 75, b) 42 wt. % polyethylene glycol, and c) the remainder, mineral partitioning agent.

PPA-2: a blend containing a) 32 wt. % of a vinylidene fluoride/hexafluoropropylene (60/40 wt. ratio) copolymer fluoroelastomer having a ML(1+10) at 121° C. of 75, b) 65 wt. % polycaprolactone, and c) the remainder, mineral partitioning agent.

PPA-3 a blend containing a) 66 wt. % of a vinylidene fluoride/hexafluoropropylene (60/40 wt. ratio) copolymer fluoroelastomer having a ML(1+10) at 121° C. of 40, b) 27 wt. % polycaprolactone, and c) the remainder, mineral partitioning agent.

Example 1

Comparative extrudable compositions (Samples A–B) and an extrudable composition of the invention (Sample 1) were prepared by letting down the respective polymer process aid masterbatch in mLL-LDPE resin blend on an extruder. Total process aid concentration (fluoroelastomer+interfacial agent) in the extrudable compositions was 500 ppm.

Blown films 25 microns in thickness were produced from these compositions using a 2.5 inch (0.98 cm) 24:1 L/D extruder equipped with a 4 inch (1.58 cm) blown film die having a 0.030 inch (0.12 mm) gap. Barrel zone temperatures (starting at the feed section) were 160° C., 180° C., 194° C., and 190° C., with adapter and die temperatures of 200° C. Melt temperature for each run was 212 to 214° C., and the die pressure at the start of each run was in the range of 27.7 to 28.3 MPa. The screw was a conventional design with a barrier flight, operating at 40 revolutions per minute (rpm). Extruder output at the start of each run was 45.4 kg/hour, resulting in apparent shear rates in the die gap of approximately 500 sec$^{-1}$.

Prior to each test run, the extruder and die were purged with a masterbatch containing 50% silica (diatomaceous earth) in order to remove the fluoroelastomer from the previous test. After purging the silica masterbatch from the extruder with mLL-LDPE, blown film was produced using 100% mLL-LDPE for 10 minutes to ensure that each test began with 100% melt fracture.

When the extrudable composition being tested dropped into the feed throat of the extruder, a digital timer with a one second readout was started. The melt fracture removal performance of each extrudable composition was monitored by continuous visual observation of the roughness of the melt exiting the die and of the blown film. When no melt fracture was visible in this manner, the digital timer was stopped, and a film sample was taken for inspection to ensure that the melt fracture was completely eliminated and to determine whether elliptically shaped defects were present. If the melt fracture was completely removed, the conditioning time was recorded as the time registering on the digital timer.

The results of these tests are shown in Table I.

TABLE 1

| Extrudable Composition | Masterbatch | Conditioning time (min) | Elliptical Defects |
|---|---|---|---|
| Sample 1 | PPA-3 | 23 | none |
| Comparative Sample A | PPA-1 | 12 | scattered |

TABLE 1-continued

| Extrudable Composition | Masterbatch | Conditioning time (min) | Elliptical Defects |
|---|---|---|---|
| Comparative Sample B | PPA-2 | 10 | numerous |

What is claimed is:

1. An extrudable composition comprising:
   A) a resin blend comprising 1 to 99 weight percent, based on total weight of said resin blend, of a metallocene catalyzed linear low density polyethylene resin copolymer of ethylene and an α-olefin, said resin having a molecular weight distribution less than 3 and 99 to 1 weight percent, based on total weight of said resin blend, of a low density polyethylene resin homopolymer having a molecular weight distribution greater than 3;
   B) 25 to 2000 ppm, based on total weight of said extrudable composition, of a fluoroelastomer having a Mooney viscosity ML(1+10) at 121° C. between 30 and 60; and
   C) an interfacial agent in an amount resulting in a weight ratio of interfacial agent to fluoroelastomer between 0.1 and 0.9; wherein said extrudable composition contains 0 to 20 ppm ionomer.

2. An extrudable composition of claim 1 wherein said resin blend comprises 50 to 90 weight percent, based on total weight of said resin blend, of a metallocene catalyzed linear low density polyethylene resin and 50 to 10 weight percent, based on total weight of said resin blend, of a low density polyethylene resin.

3. An extrudable composition of claim 1 wherein said fluoroelastomer comprises copolymerized units selected from the group consisting of i) vinylidene fluoride/hexafluoropropylene; ii) vinylidene fluoride/hexafluoropropylene/tetrafluoroethylene; iii) tetrafluoroethylene/propylene; and iv) tetrafluoroethylene/propylene/vinylidene fluoride.

4. An extrudable composition of claim 3 wherein said fluoroelastomer comprises copolymers of vinylidene fluoride/hexafluoropropylene.

5. An extrudable composition of claim 1 wherein said interfacial agent is selected from the group consisting of i) silicone-polyether copolymers; ii) aliphatic polyesters; iii) aromatic polyesters; iv) polyether polyols; v) amine oxides; vi) carboxylic acids; vii) fatty acid esters; and vii) poly(oxyalkylene) polymers.

6. An extrudable composition of claim 5 wherein said interfacial agent is an aliphatic polyester.

7. An extrudable composition of claim 6 wherein said aliphatic polyester is a polycaprolactone having a number average molecular weight between 1000 and 32000.

8. An extrudable composition of claim 5 wherein said interfacial agent is a poly(oxyalkylene) polymer.

9. An extrudable composition of claim 8 wherein said poly(oxyalkylene) polymer is a polyethylene glycol.

* * * * *